US005485958A

United States Patent [19]

Nightingale

[11] Patent Number: 5,485,958

[45] Date of Patent: Jan. 23, 1996

[54] MECHANISM FOR OPERATING A CASCADE OF VARIABLE PITCH VANES

[75] Inventor: Douglas J. Nightingale, Jonesboro, Ga.

[73] Assignee: Rolls-Royce, Incorporated, Reston, Va.

[21] Appl. No.: 254,703

[22] Filed: Jun. 6, 1994

[51] Int. Cl.[6] .................................................. B64C 15/00

[52] U.S. Cl. .................................. 239/265.19; 244/12.5

[58] Field of Search ......................... 239/265.11, 265.19, 239/265.25–265.29, 265.33–265.39; 244/12.5, 23 D, 52, 110 B; 60/230, 232, 262, 271

[56] References Cited

U.S. PATENT DOCUMENTS

| | | | |
|---|---|---|---|
| 3,081,597 | 3/1963 | Kosin et al. | 239/265.35 X |
| 3,087,303 | 4/1963 | Heinze et al. | 239/265.35 X |
| 3,206,929 | 9/1965 | Marchant et al. | 60/230 X |
| 3,249,333 | 5/1966 | Corbett, Jr. | 244/12.5 X |
| 3,704,828 | 12/1972 | Studer et al. | 60/230 X |
| 3,911,673 | 10/1975 | Roginson | 60/230 X |
| 4,030,290 | 6/1977 | Stachowiak | 60/230 X |
| 4,235,397 | 11/1980 | Compton | 244/23 D X |
| 4,760,960 | 8/1988 | Ward et al. | 60/230 X |
| 4,798,328 | 1/1989 | Thayer et al. | 244/110 B X |
| 5,390,877 | 2/1995 | Nightingale | 244/12.5 X |

FOREIGN PATENT DOCUMENTS

| | | | |
|---|---|---|---|
| 1531390 | 4/1970 | Germany | 244/12.5 |
| 2013344 | 10/1971 | Germany | 244/12.5 |
| 1018581 | 1/1966 | United Kingdom . | |

*Primary Examiner*—Andres Kashnikow
*Assistant Examiner*—Lesley D. Morris
*Attorney, Agent, or Firm*—Oliff & Berridge

[57] ABSTRACT

In a V/STOL aircraft having a vectorable exhaust device in the form of a cascade of variable pitch nozzle vanes, an operating mechanism for effecting coordinated pivotal movement of the vanes is provided to vector engine thrust. The operating mechanism includes a plurality of elongate pushrods arranged in end to end abutment with a corresponding plurality of vane operating levers interspaced between the pushrods. The vanes are rotated about spanwise axes by translation of the pushrods in a direction normal to the vane axes. For a given actuating input the vanes rotate by progressively different amounts so that the combined nozzle throat area remains substantially unchanged throughout the nozzle vectoring range.

19 Claims, 7 Drawing Sheets

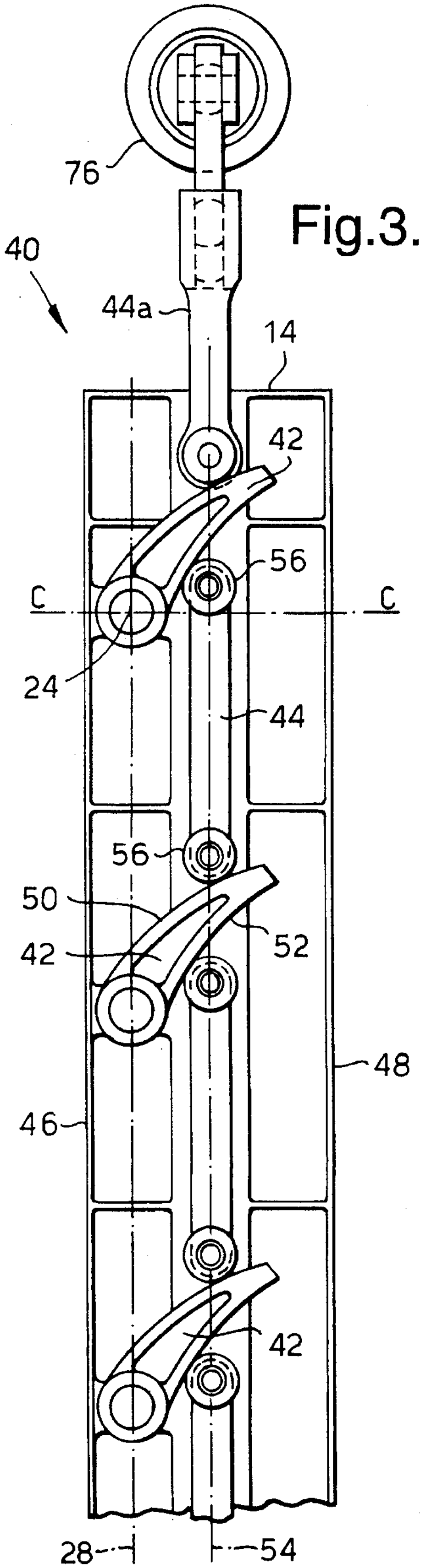
Fig.3.
Fig.4.
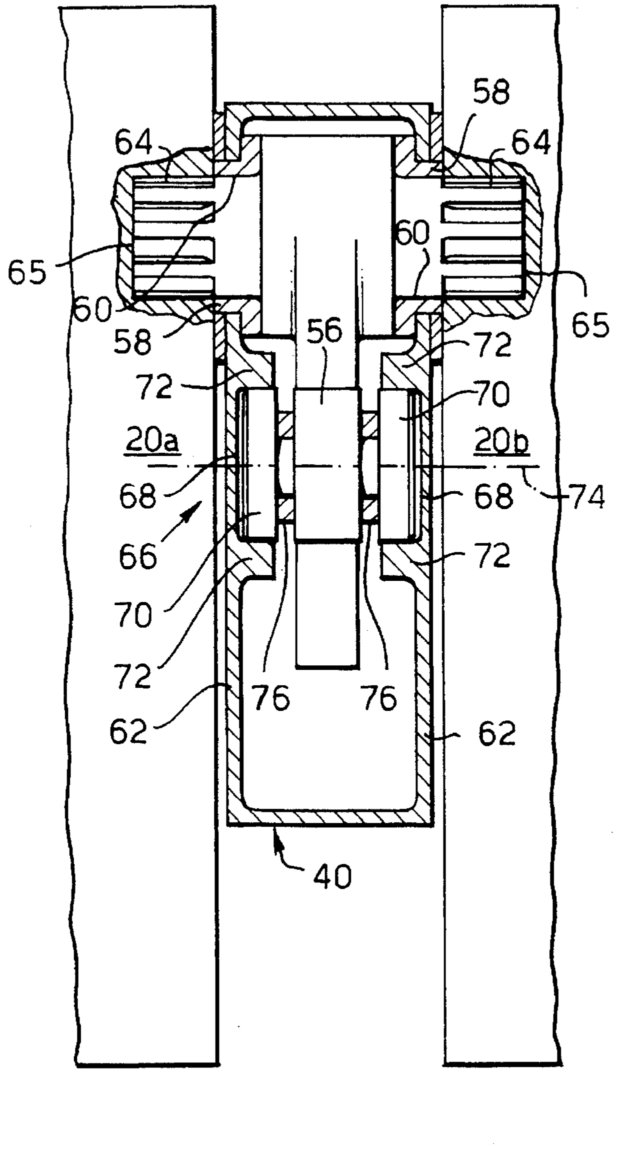

MECHANISM FOR OPERATING A CASCADE OF VARIABLE PITCH VANES

FIELD OF THE INVENTION

This invention relates to a mechanism for operating a cascade of variable pitch vanes, particularly but not exclusively the variable pitch vanes of a thrust vectoring louvered exhaust nozzle for a vertical/short take off and landing (V/STOL) aircraft.

BACKGROUND OF THE INVENTION

An example of a known louvered exhaust nozzle is described in UK Patent GB 1018581. In this disclosure a nozzle outlet for a gas turbine engine comprises a plurality of adjacent vanes which are each pivotally mounted to a support for spanwise rotation. The vanes are linked together for coordinated pivotal movement by means of a rigid connecting rod. Collectively the vanes, support and connecting rod define a parallelogram linkage. In use the thrust produced by the nozzle can be directed in selective predetermined directions by rotating the vanes.

Louvered exhaust nozzles offer many advantages over conventional vectorable nozzles, particularly for aircraft which utilize lift fans for vertical thrust. In these applications it is necessary for the lift units and associated vectorable nozzles to be located within the aircraft structure. With conventional vectorable nozzles it is not always possible to achieve this requirement without first compromising airframe design in accordance with nozzle stowability. This problem does not arise with the inherently compact louvered exhaust nozzle, which, during periods of non use, may be stowed in a relatively tight envelope simply by rotating the nozzle vanes flush with the aircraft fuselage.

A major problem associated with prior art louvered exhaust nozzles resides in the nozzle's ability to provide satisfactory performance over a wide vectoring range. This problem arises because in the parallelogram type arrangement described the vanes are constrained to rotate by equal amounts throughout the nozzle vectoring range. This causes the combined nozzle throat area to vary as the vanes rotate, resulting in problems associated with area mismatching. It is well understood that these problems can be overcome by providing each of the vanes with its own separate actuator so that the vanes may be rescheduled by different amounts in a manner which avoids area variation. Unfortunately this is not a practical solution for aircraft powerplant applications as any benefit derived would be negated by the increased weight and complexity of the nozzle actuation system.

SUMMARY OF THE INVENTION

The present invention therefore has for an objective the provision of a variable pitch louvered exhaust nozzle outlet which is capable of achieving the necessary thrust vectoring range required for transition between VTOL and forward flight, and which avoids the area mismatching problems of the prior art without incurring substantial weight penalties.

In its broadest sense the invention provides a mechanism for operating a cascade of variable pitch vanes comprising:

- a plurality of adjacent vanes, each one pivotally mounted about a spanwise axis of rotation spaced apart from the spanwise axis of its neighbor,
- a plurality of cam means, each one fixed in relation to a respective one of the vanes,

- a plurality of pushrods mounted for axial movement along a pushrod axis, the pushrods being interspaced between the cam means for effecting coordinated pivotal movement of the vanes and urged into end to end abutment with the cam means so that the spacing between neighboring pushrod ends is determined by the thickness of the intervening cam means in a plane of intersection of the pushrod axis, the plane of intersection being spaced apart from the spanwise axes of the vanes so that the spacing between neighboring pushrods alters in accordance with the angular movement of the intervening cam means, and
- actuator means for moving the pushrods, whereby for a given actuating input there is a cumulative effect between successive pushrods so that along the cascade the vanes are turned through progressively greater or lesser angles.

BRIEF DESCRIPTION OF THE DRAWINGS

The invention will now be described in greater detail with reference, by way of example only, to the accompanying drawings.

FIG. 3 is a part section view of the nozzle of FIG. 1 taken along line B—B showing the vane operating mechanism of the present invention;

FIG. 4 is a section view of the vane operating mechanism taken along line C—C of FIG. 3;

DETAILED DESCRIPTION OF THE PREFERRED EMBODIMENTS

Figure 1:
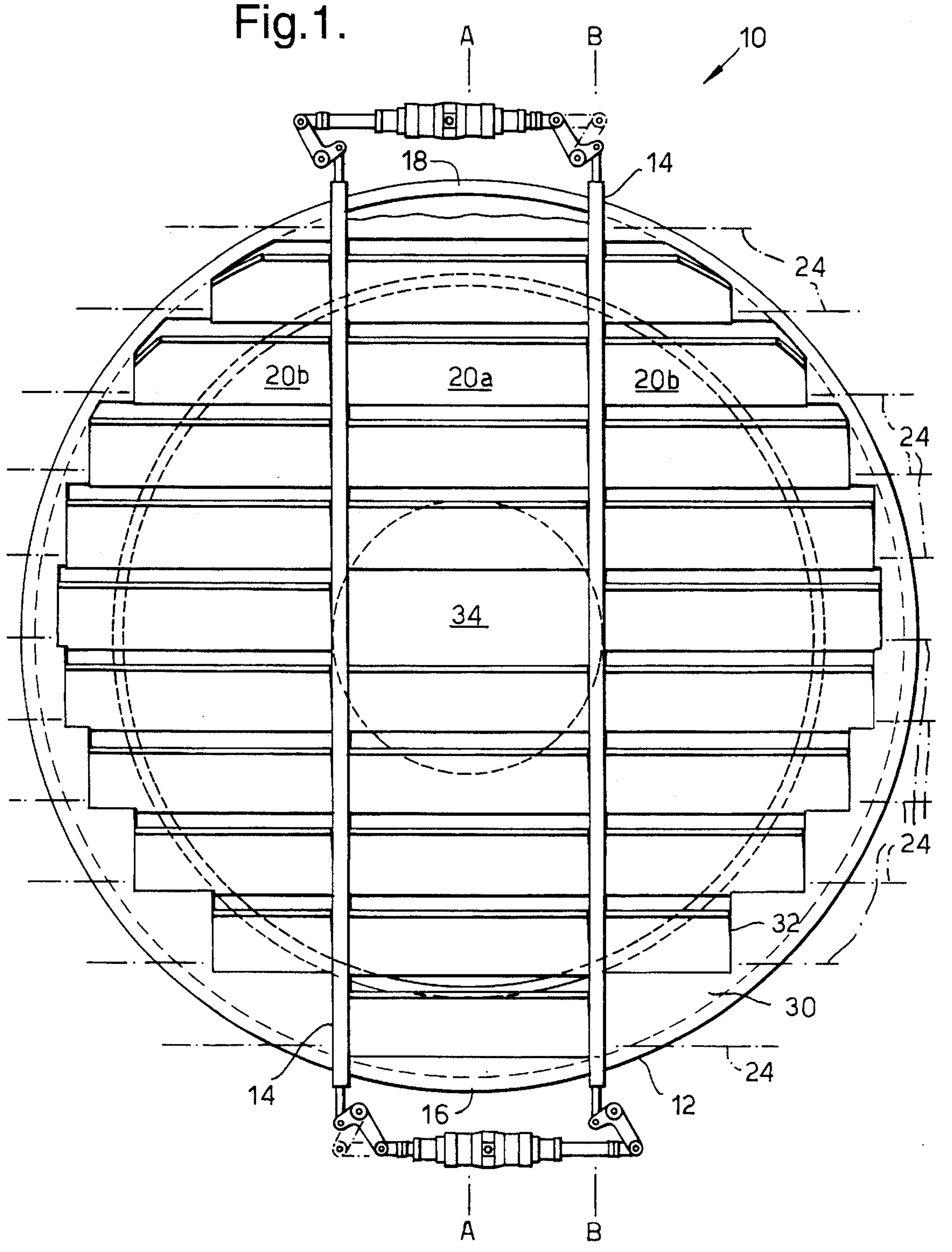
FIG. 1 is a plan view showing a variable pitch louvered exhaust nozzle.

Referring first to FIG. 1, there is shown a louvered exhaust nozzle outlet 10 for a V/STOL aircraft application.

The nozzle shown includes a flanged outer ring 12 for attachment to the underside of a lift fan unit (not shown) having a main discharge axis 13. Attached to the ring are a pair of elongate box section longerons 14 which extend parallel between front and rear ends 16 and 18 of the nozzle respectively. Together the ring 12 and longerons 14 support a plurality of longitudinally extending vanes 20 which extend parallel between opposing sides of the ring to form a cascade type nozzle outlet.

Figure 2:
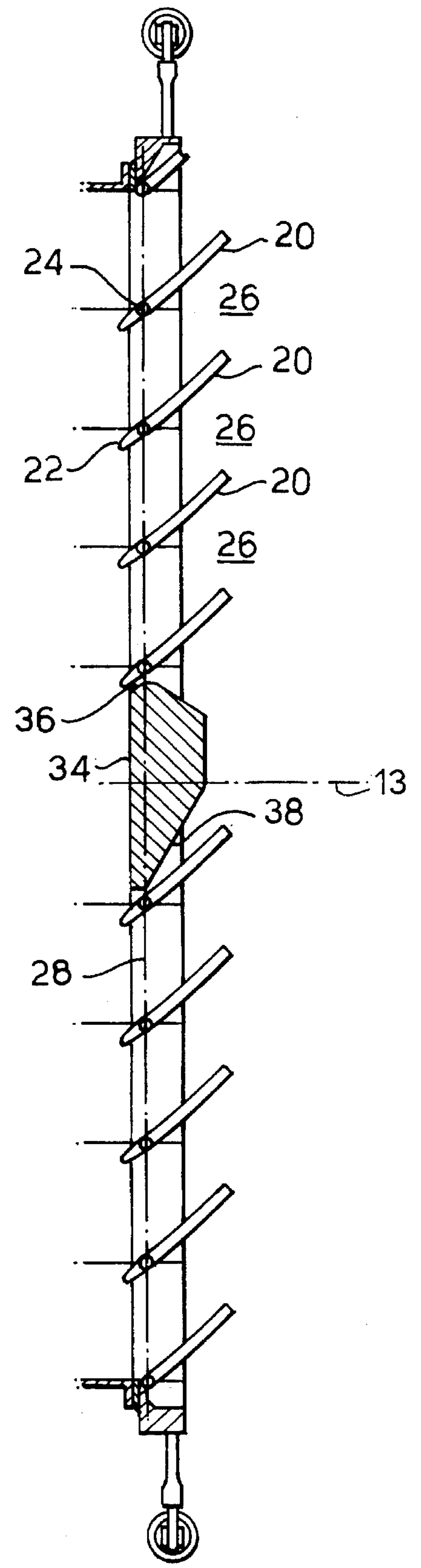
FIG. 2 is a section view taken along line A—A of FIG. 1.

Referring now to FIG. 2, each vane is pivotally mounted towards its leading edge 22, about a spanwise axis of rotation 24 which is spaced apart from the spanwise axis of its neighbor. The vanes are equally spaced along the cascade and their axes of rotation 24 aligned in the direction of the longerons 14 along an axis 28.

In the position shown the vanes 20 define a series of convergent flow passages 26 which have substantially similar flow cross sections. The vanes 20 have a constant chordal thickness and terminate with a blunt base at their trailing edge. The blunt trailing edge minimizes the risk of over expanding the exiting fan flow at extreme vectoring positions, a problem which might otherwise occur if conventional tapered vanes having sharp trailing edges were used.

Because the longerons interrupt the span of the vanes, all but the first and final vanes positioned along the cascade are discontinuous and include one central **20*a* and two end sections 20*b*. The end sections 20*b* of each vane are at one end pivotally mounted to an adjacent one of the longerons 14, and at the other to a mounting ring 30 attached to the cuter flange ring 12. The mounting ring 30 has a generally convoluted shape defined by a series of flat surfaces 32 formed at each vane pivot location. The flat surfaces 32 are formed in a plane normal to the pivot axes 24 of the vanes so that an effective seal can be maintained between the vanes and the mounting ring when the vanes rotate. The central vane sections 20*a* which extend between the longerons 14 are themselves pivotally mounted to the longerons at their respective spanwise ends. As will become more apparent later, corresponding central 20*a* and end 20*b* vane sections are not independently movable about their common pivot axis, but connect through the longerons 14** to form a single rigid vane structure.

In the embodiment shown the central section **20*a* of the central vane is missing. A rectangular aerodynamic body 34 is attached to the longerons 14 in place of the central vane section 20*a*. The aerodynamic body acts to seal the area of the nozzle which is directly below the hub of the lift fan unit. As is best seen with reference to FIG. 2, the lateral edges 36 and 38 of the body 34** are shaped to match the adjacent vane profile so that leakages are minimized during operation.

Located within each of the longerons 14 there is provided a vane operating mechanism 40 for effecting coordinated pivotal movement of the vanes. The two parallel operating mechanisms are identical and are best described with reference to FIGS. 3 and 4.

FIG. 3 shows in detail one end of the vane operating mechanism of the present invention. The other end which is identical has been omitted for clarity. In general the operating mechanism 40 comprises a plurality of vane operating levers 42 which connect the vanes to the longeron structure 14, and a plurality of axially aligned elongate pushrods 44 which act to position the vanes about their respective axes 24. As shown the operating mechanism is totally enclosed within the longeron structure between an upstream side member 46 and a downstream side member 48. At one end the operating levers 42 are pivotally mounted towards the upstream side member 46 about vane axes 24, and at the other end extend towards the downstream side member 48. Each operating lever 42 includes a pair of cam abutment surfaces 50,52 which extend along the length of the lever. For reasons which will become apparent later the abutment surfaces 50,52 are arcuate and the levers taper towards their distal end.

Interspaced between the operating levers 42 are the pushrods which extend in end to end abutment with the cam surfaces 50,52 of adjacent levers along an axis 54. The pushrods are translatably mounted along axis 54 for moving the vane operating levers and associated vanes about their respective pivot axes 24. Cam followers in the form of rollers 56 are positioned at the pushrod ends to engage adjacent abutment surfaces 50,52.

Referring now to FIG. 4 the operating levers 42 are mounted on the longeron structure 40 by means of journal bearings 58 located in apertures 60 formed in opposing longeron side members 62. A pair of co-axial stub shafts 64 protrude at the proximal end of each operating lever to locate the lever within the journal bearings 58. The stub shafts 64 are splined part way along their length and locate in correspondingly splined recesses 65 formed in the adjacent vane sections **20*a* and 20*b***.

The longeron side members 62 also define a guide 66 centrally positioned within the longeron structure 14. The guide 66 includes a pair of trackways 68 which extend in the direction of the pushrod axis 54 along the longeron side members 62. Each trackway 68 is engaged by pushrod rollers 70 positioned at the pushrod ends. Trackways 68 each comprise a pair of confronting flanges 72 which engage opposing sides of the pushrod rollers 70. The spacing between the flanges 72 is such that they prevent lateral movement of the pushrods within the longeron structure.

As shown at each pushrod end the side rollers 70 and cam roller 56 are mounted co-axially on a common axis 74. The pushrod ends are forked and include a pair of support members 76 which support the rollers 56 and 70 about axis 74.

As can be determined from FIG. 3, the end pushrods 44a at the front and rear of the nozzle locate at one of their ends within the guide 66 in the manner described, and at their other end extend outwards of the guide and pivotally connect to a linear actuator 76. This is best seen with reference to FIG. 5 which like FIG. 3 shows the arrangement at one end of the nozzle only.

Actuator 76 is of the double acting mechanical ballscrew type and connects to the end pushrods 44a of each mechanism 40 in a manner which provides for synchronous operation. The actuator 76 includes a pair of opposing output rams 78, each one of which is pivotally connected to a respective one of two bell crank levers 80,82. Bell crank levers 80,82 are suitably anchored to nozzle or aircraft structure at pivots 84,86 respectively, and are pivotally connected to a respective one of the end pushrods **44*a* at pivots 88,90. In a similar manner the actuators 76** at both ends of the nozzle are secured to fixed nozzle or aircraft structure so that all actuation loads are directly supported.

The front and rear actuators 76 are connected for synchronous operation. In the preferred embodiment interconnecting high speed flexible drive cables (not shown) link the two actuators 76 through gearing housed within the actuators. The cables provide a common drive so that both actuators operate in unison when energized. The same effect could of course be achieved by utilizing a pair of hydraulically operated servo actuators coupled to a common pressure source. Mechanical ball screw actuators are preferred, however, as the interconnecting rotary drive cables can be pretensioned to provide a compressive end load between the end pushrods **44*a* of each mechanism 40**. In the arrangement described an end load is necessary in order to maintain pushrod and operating lever abutment and thereby prevent free independent vane movement. The torsional elasticity of the drive cables provides a suitable means by which to achieve this.

During nozzle operation the front and rear actuators 76 act in synchronism to position the pushrods along the guides 66. At all times the actuators 76 hold the pushrods and operating levers in abutment so that when the pushrods move the vanes rotate in unison. When energized the actuators rotate the vanes about their respective axes 24 in a collective and coordinated manner, the exact manner being determined by the operating mechanism geometry. Throughout the vectoring range the compressive end load in each operating mechanism acts to maintain pushrod and operating lever abutment regardless of scheduled actuator positions. This ensures the vanes follow a predetermined schedule regardless of manufacturing tolerances and operating mechanism wear.

Figure 5:
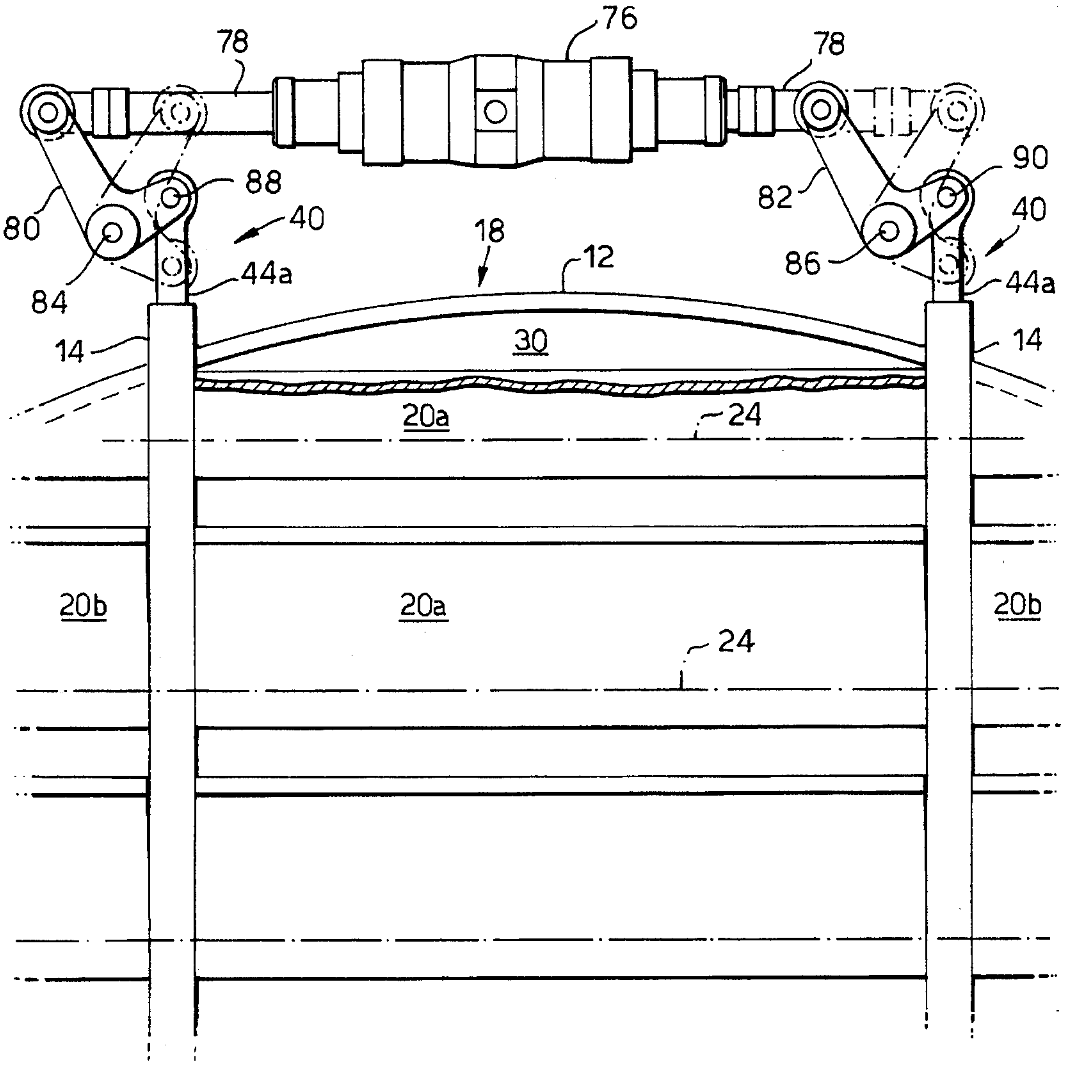
FIG. 5 is a detailed plan view of one end of the nozzle shown in FIG. 1.
Figure 6:
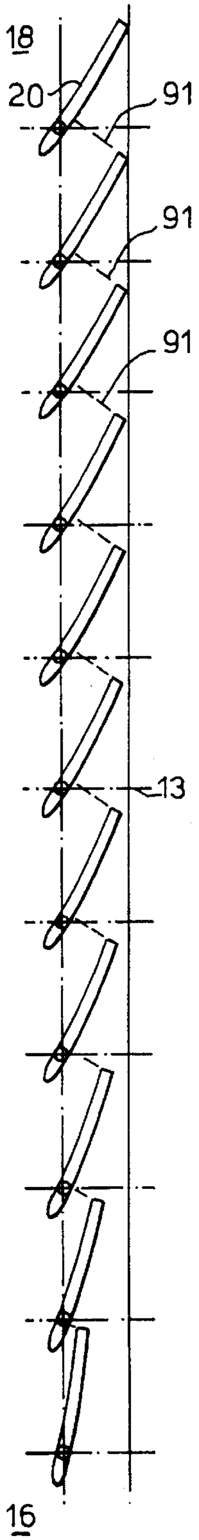
FIG. 6 shows the vanes of the nozzle of FIG. 1, in the same transverse sectional view as FIG. 2,in a stowed configuration.
Figure 9:
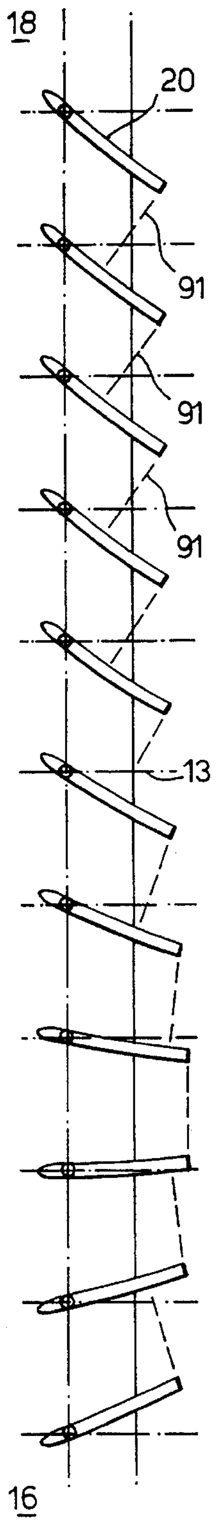

The vanes are movable between the end position shown in FIGS. 6 and 9. In FIG. 6 the vanes are rotated as far rearward as the operating mechanism 40 will allow by movement of the actuator rams 78 to the positions shown by the solid lines in FIGS. 1 and 5. In this position the vanes are stowed and the nozzle does not receive any flow.

Figure 7:
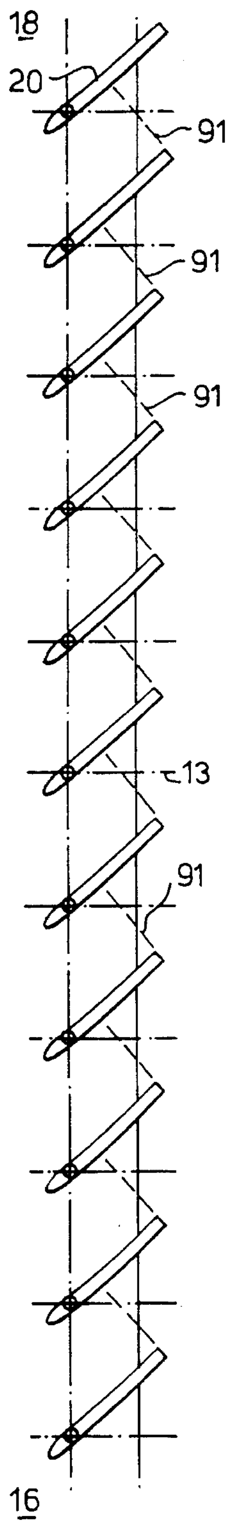
FIGS. 7, 8 and 9 show the vanes of the nozzle of FIG. 1, in the same transverse sectional view as FIGS. 2 and 6, positioned for respective rearward, downward and forward nozzle operation.
Figure 8:
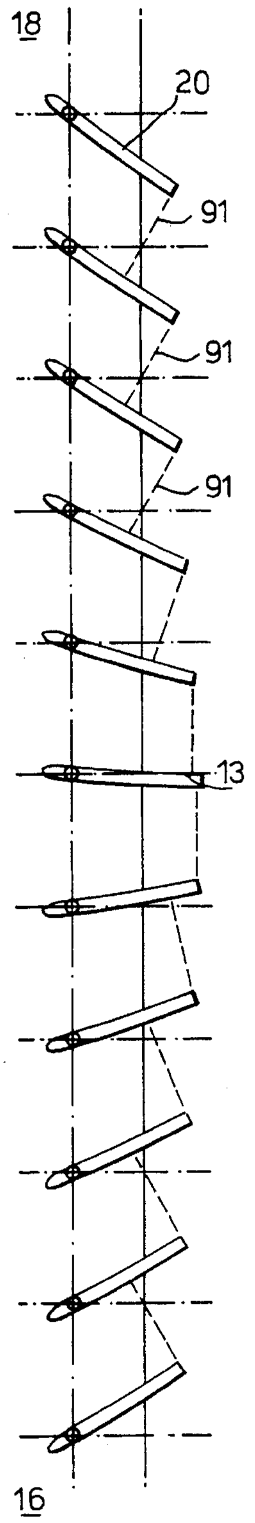

The operating or vectoring range of the nozzle is shown with reference to FIGS. 7, 8 and 9. In FIG. 7 vanes are rotated to the position shown by movement of the actuator rams 78 towards the chain dot position shown in FIG. 1 and 5. In this position all the vanes lie in the same direction, 45 degrees aft in respect to the fan axis 13. This represents the maximum aft vectoring position of the nozzle cascade. As shown the vanes define a series of convergent nozzle passages 26 each having similar throat cross sections. The throat area of each passage is determined by the distance between the trailing edge of one vane and the confronting surface of the adjacent vane in a direction normal to that surface. This distance is generally indicated by lines 91 in FIGS. 7 to 9.

In FIG. 8 the vanes have been rotated to the vertical or zero vector position shown from the position of FIG. 7 by further movement of the actuator rams 78 towards the chain dot position of FIGS. 1 and 5. The vanes still define convergent nozzle passages but now lie in different directions with respect to each other. In this position the overall effect of the nozzle is to discharge gas flow downwards in the direction of the fan axis 13 to provide vertical lift.

The maximum forward nozzle position is shown in FIG. 9, where the actuator rams 78 have been extended to the chain dot position shown in FIG. 5. This additional movement of the pushrods by the actuator causes the vanes to rotate further to the forward position shown. Again, the vanes continue to define a series of convergent flow passages 26, some in this case more convergent than others. In this position the net effect of the cascade is to direct the fan discharge flow forwards with respect to the fan axis.

As can be determined from FIGS. 6–9 the operating mechanism 40 causes the vanes to rotate progressively by different amounts. As the vanes are rotated towards the maximum forward deflected position (FIG. 9) the nozzle flow passages progressively converge until the zero deflection position is reached (FIG. 8), where the degree of convergence is greatest. From this point onwards the degree of convergence progressively diminishes until the maximum forward deflection position is reached. The non-linear relationship between adjacent vanes results in relatively small changes in the overall nozzle throat area as the vanes rotate.

Figure 10:
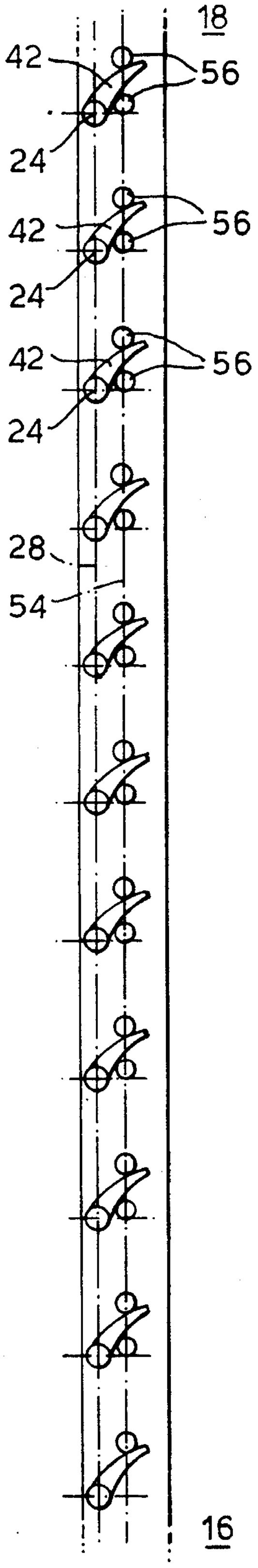
FIGS. 10, 11 and 12 show schematically the vane operating mechanism of FIG. 3 positioned in accordance with the vane positions of FIGS. 7, 8 and 9 respectively.
Figure 11:
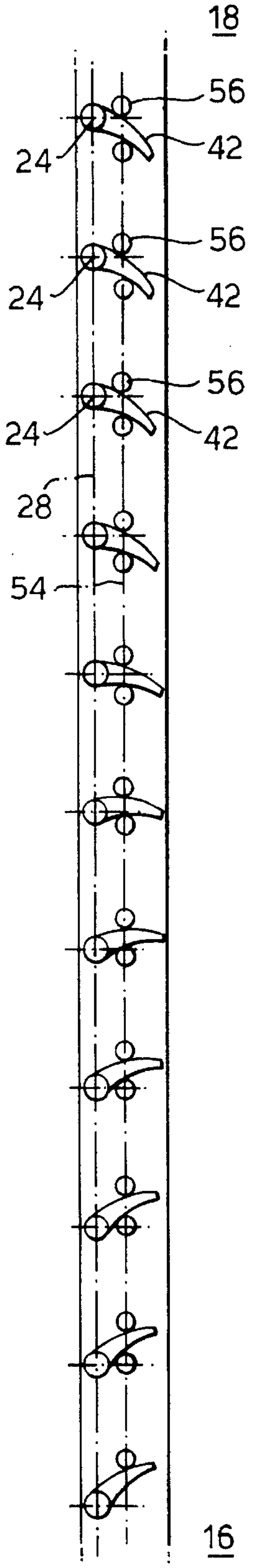
Figure 12:
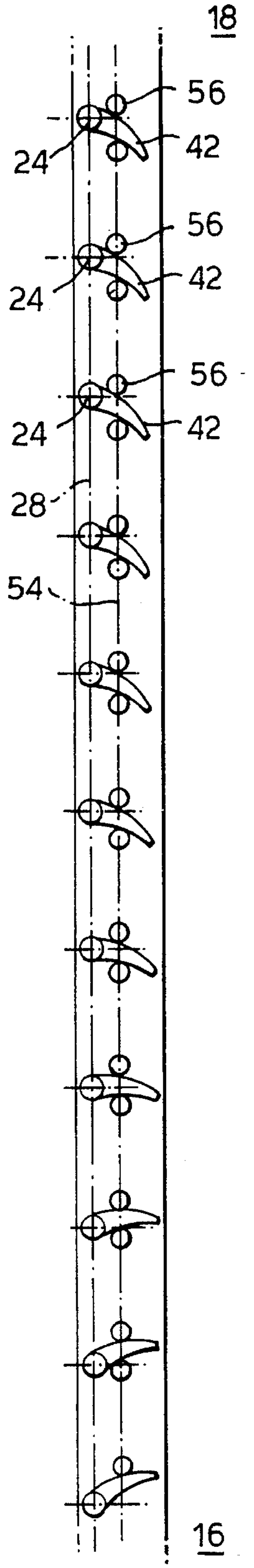

The manner in which the operating mechanism achieves this non-linear relationship is best explained with reference to FIGS. 10, 11 and 12. FIGS. 10, 11 and 12 show the operating levers 42 of the mechanism and pushrod rollers 56 in abutment with the levers in accordance with the vane positions in FIGS. 7, 8 and 9 respectively. Referring first to FIG. 10 the operating levers are all at the same angle and the spacing between each pair of neighboring pushrod ends is equal. As can be determined from FIGS. 10–12 the spacing between neighboring pushrod ends is not fixed but varies as the vanes rotate. The spacing is determined by the distance between the adjacent abutment surfaces 50,52 of the intervening operating lever 44 in a plane of intersection of the pushrod axis 54. This spacing varies from a maximum when the levers lie substantially in the direction of the pushrod axis 54 to a minimum when the levers are disposed substantially normal to that axis.

Movement of the actuator rams in the manner described causes the pushrods to translate by progressively different amounts. For a given actuating input there is a cumulative effect between successive pushrods so that along the cascade the vanes are turned through progressively different amounts.

As will be appreciated from the foregoing the linear travel required to rotate the rearward end vane is much greater than that required to translate the forward end vane. Accordingly, it is necessary to provide a differential gearing system between the front and rear actuators. This may simply be achieved by different bell crank lever lengths at opposing ends of the nozzle.

Figure 13:
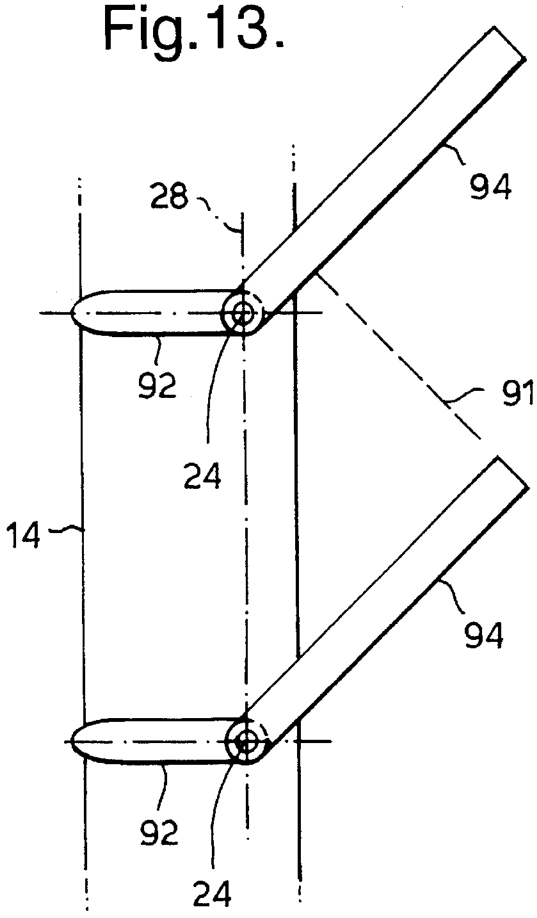
FIG. 13 is a transverse section through a vane in accordance with a second aspect of the invention.

In the embodiment described the vanes are cambered so that they present the same angle of incidence to the discharging gas flow at both extremes of the operating range (FIGS. 7 and 9). In certain applications, that is those requiring a wide vectoring range, the incidence angle may be too great when the vanes are rotated to the extreme positions. In such applications it may be more desirable to utilize vanes of the type shown in FIG. 13. The vanes shown have a fixed leading section 92 and variable camber rotatable trailing edge section 94. In this arrangement the two vane sections 92,94 are articulated together about the vane pivot axis 24. The trailing edge section 94 is connected to the operating lever as previously described and leading edge section 92 is fixed to the longeron structure. With vanes of this configuration a constant angle of incidence is presented to the oncoming gas flow throughout the nozzle vectoring range.

Figure 14:
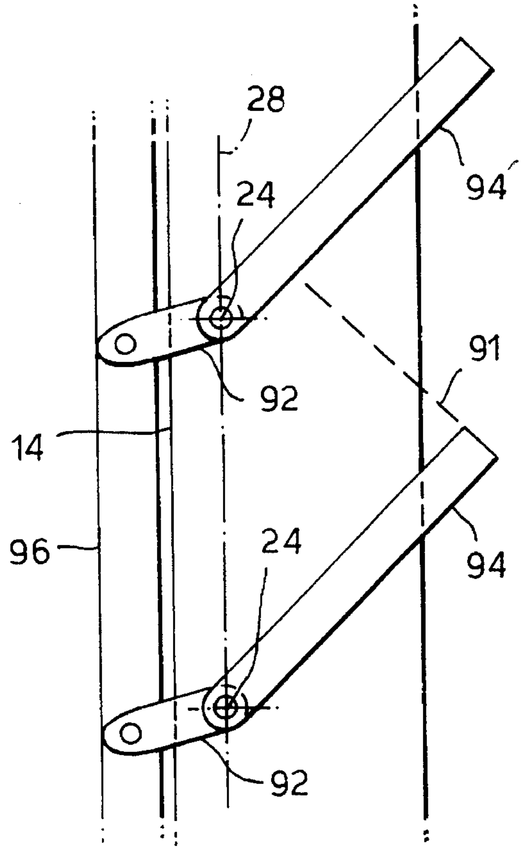
FIG. 14 is a transverse section through an alternative vane to that of FIG. 13.

Further control of the vane incidence angle is provided by the arrangement shown in. FIG. 14. This arrangement differs from that in FIG. 13 only in that the leading edge sections 92 are independently movable with respect to the trailing edge sections 94. The leading edge sections 92 are each pivotally mounted to a translatable rod element 96 which together with the vane sections 92 and longeron structure 14 define a parallelogram type linkage. Rod 96 extends along the length of the longeron structure 14 so that its presence does not contribute any further drag to the nozzle. As will be appreciated translation of the rod 96 effects coordinated movement of all the leading edge sections in the cascade independently of trailing edge sections 94. The rod 96 may be translated by either of the actuators 76 by the provision of further bell crank levers (not shown), or may alternatively be actuated by a separate actuation system.

For any given nozzle of the type described the degree of throat area variation will depend on the number of vanes employed. Typically the greater the number of vanes the smaller the area variation will be. There is, however, another consideration. It can be seen that in the zero vector position of FIG. 8 not all the exiting flow contributes to vertical thrust. There is a so-called cosine loss since part of the exiting flow has an inward component. This loss is proportional to the number of vanes employed. Typically the loss is lowest when a relatively small number of vanes are used.

On the one hand there is a requirement to limit the number of vanes for propulsion efficiency, and on the other there is a conflicting requirement to increase the number of vanes for nozzle throat area variation considerations. The nozzle shown has eleven vanes which is thought to be optimum. Nozzles having between ten and fourteen vanes would, it is thought, provide for satisfactory performance.

Although the nozzle shown has two parallel operating mechanisms 40 it is to be understood that the nozzle could be provided with only one of these mechanisms. Also without departing from the scope of the invention the operating mechanism could be arranged such that the cam abutment surfaces against which the pushrods act are formed integrally with the vanes. In such an arrangement there would be no requirement for separate operating levers housed within the longeron structure. Also it is to be appreciated that the operating levers do not necessarily have to be curved. The operating levers could be of any configuration as long as they extend sufficiently to bisect the pushrod axis. However, the arcuate profile of the operating levers is preferred as it ensures that'the pushrod rollers 56 do not disengage when the vanes are rotated to the stowed position of FIG. 6.

I claim:

1. A mechanism for operating a cascade of variable pitch vanes comprising:

a plurality of adjacent vanes, each one pivotally mounted about a spanwise axis of rotation spaced apart from the spanwise axis of its neighbor, a plurality of cam means, each one fixed in relation to a respective one of the vanes, a plurality of pushrods mounted for axial movement along a pushrod axis, the pushrods being interspaced between the cam means for effecting coordinated pivotal movement of the vanes and urged into end to end abutment with the cam means so that the spacing between neighboring pushrod ends is determined by thickness of the intervening cam means in a plane of intersection of the pushrod axis, the plane of intersection being spaced apart from the spanwise axes of the vanes so that the spacing between neighbouring pushrods alters in accordance with the angular movement of the intervening cam means, and actuator means for moving the pushrods, whereby for a given actuating input there is a cumulative effect between successive pushrods so that along the cascade the vanes are turned through .progressively greater or lesser angles.

2. A mechanism as claimed in claim 1 wherein the actuator means comprises a first actuator for providing a first actuating input to a first one of the pushrods, and a second actuator for providing a second actuating input to a final one of the pushrods, whereby the first and second actuators act to hold the pushrods and cam means in abutting relationship.

3. A mechanism as claimed in claim 1 wherein each cam means includes a pair of profiled cam abutment surfaces.

4. A mechanism as claimed in claim 3 wherein the cam abutment surfaces have a generally arcuate profile.

5. A mechanism as claimed in claim 4 wherein the cam abutment surfaces are formed integrally with the vanes.

6. A mechanism as claimed in claim 4 wherein each cam means also comprises a pivotally mounted operating lever wherein the cam abutment surfaces are formed integrally with the operating levers.

7. A mechanism as claimed in claim 6 wherein the operating levers connect to respective ones of the spanwise ends of the vanes.

8. A mechanism as claimed in claim 1 wherein each pushrod comprises an elongate member having cam follower means positioned at its ends.

9. A cascade of variable pitch vanes comprising:

a plurality of adjacent vanes, each one pivotally mounted about a spanwise axis of rotation spaced apart from the spanwise axis of its neighbor, and an operating mechanism for effecting coordinated pivotal movement of the vanes in a predetermined relationship, including:

a plurality of cam means each one fixed in relation to a respective one of the vanes, a plurality of pushrods mounted for axial movement along a pushrod axis, the pushrods being interspaced between the cam means for effecting coordinated pivotal movement of the vanes and urged into end to end abutment with the cam means so that the spacing between neighboring pushrod ends is determined by the thickness of the intervening cam means in a plane of intersection of the pushrod axis, the plane of intersection being disposed spaced apart from the spanwise axes of the vanes so that the spacing between neighboring pushrods alters in accordance with the angular movement of the intervening cam means, and actuator means for moving the pushrods, whereby for a given actuating input there is a cumulative effect between successive pushrods so that along the cascade the vanes are turned through progressively greater or lesser angles.

10. A cascade of variable pitch vanes as claimed in claim 9 wherein each vane comprises a leading edge section and a trailing edge section articulated together for pivotal movement about their spanwise axis of rotation.

11. A cascade of variable pitch vanes as claimed in claim 10 wherein the cam means are fixed in relation to the trailing edge sections of the vanes.

12. A cascade of variable pitch vanes as claimed in claim 11 wherein the vanes are each pivotally mounted to a support and the leading edge section of each of the vanes is fixed in relation to the support.

13. A cascade of variable pitch vanes as claimed in claim 11 further comprising a translatable link element which couples the leading edge sections of the vanes for coordinated pivotal movement relative to the trailing edge sections.

14. An exhaust nozzle outlet for a fluid flow duct comprising:

a plurality of adjacent vanes, each one pivotally mounted about a spanwise axis of rotation spaced apart from the spanwise axis of its neighbor, and an operating mechanism for effecting coordinated pivotal movement of the vanes in a predetermined relationship, including:

a plurality of cam means, each one fixed in relation to a respective one of the vanes, a plurality of pushrods mounted for axial movement, the pushrods being interspaced between the cam means for effecting coordinated pivotal movement of the vanes and urged into end to end abutment with the cam means so that the spacing between neighboring pushrod ends is determined by the thickness of the intervening cam means in a plane of intersection of the pushrod axis, the plane of intersection being disposed spaced apart from the spanwise axes of the vanes so that the spacing between neighboring pushrods alters in accordance with the angular movement of the intervening cam means, and actuator means for moving the pushrods, whereby for a given actuating input there is a cumulative effect between successive pushrods so that along the cascade the vanes are turned through progressively greater or lesser angles.

15. An exhaust nozzle outlet as claimed in claim 14 wherein the vanes define a series of convergent flow passages.

16. An exhaust nozzle outlet as claimed in claim 15 wherein the vanes have a generally constant chordal thickness.

17. An exhaust nozzle outlet as claimed in claim 14 having between 10 and 14 pivotal vanes.

18. An exhaust nozzle outlet for a fluid flow duct as claimed in claim 14, further comprising a second operating mechanism identical to the first operating mechanism and positioned paralleled to the first operating mechanism such that each vane receives an actuating input at two points along its length.

19. An exhaust nozzle outlet for a fluid flow duct as claimed in claim 18 wherein the actuator means comprise a first actuator for providing a first actuating input to a first one of the pushrods in both operating mechanisms, and a second actuator for providing a second actuating input to a final one of the pushrods in both operating mechanisms, whereby the first and second actuators act to hold the pushrods and cam means of both operating mechanisms in abutting relationship.

* * * * *